Inventor:
Albert Krasa

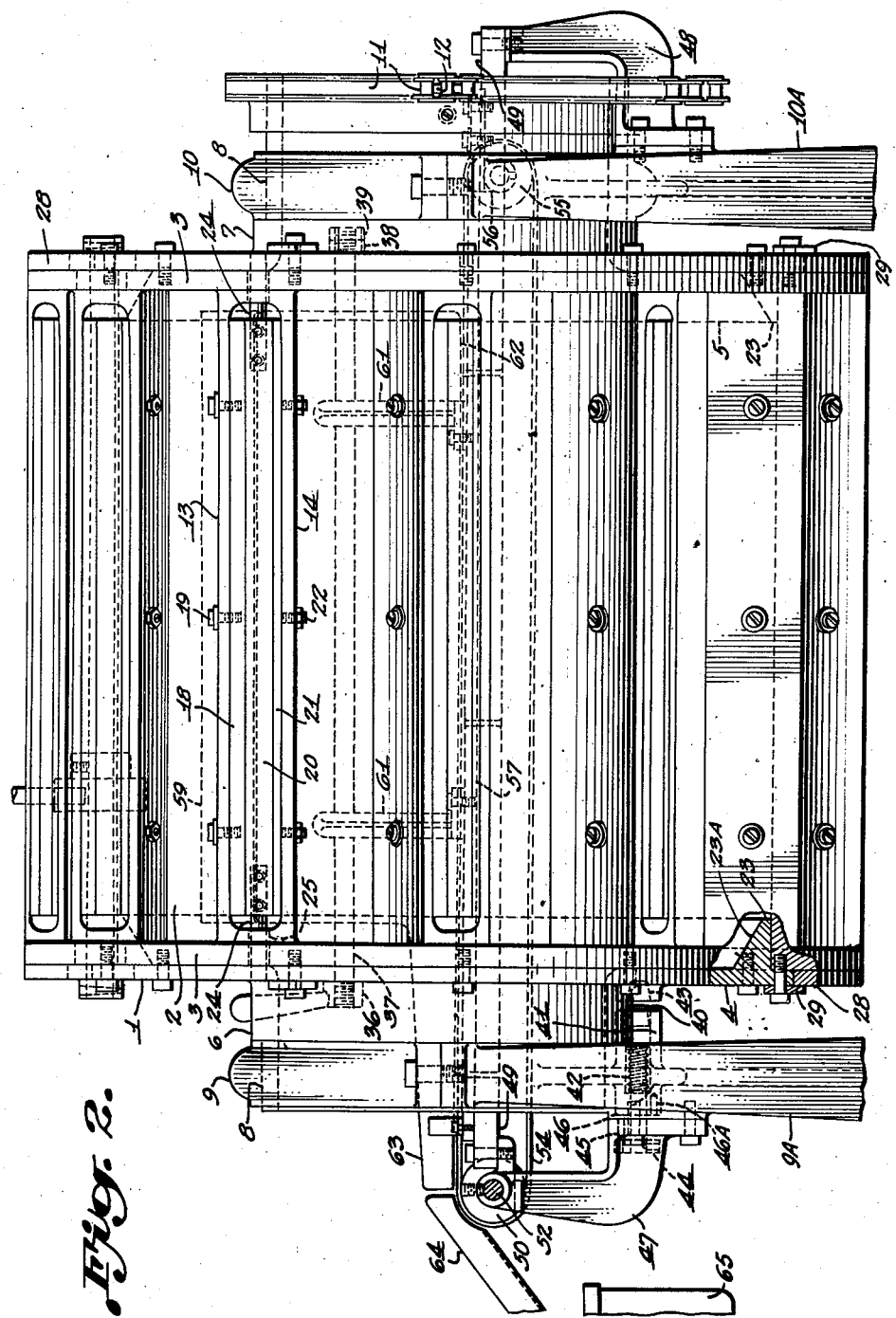

Sept. 16, 1947.  A. KRASA  2,427,410
TUMBLING CYLINDER FOR GAGING AND ASSORTING
RIVETS ACCORDING TO SHANK DIAMETER
Filed Sept. 6, 1943   3 Sheets-Sheet 3
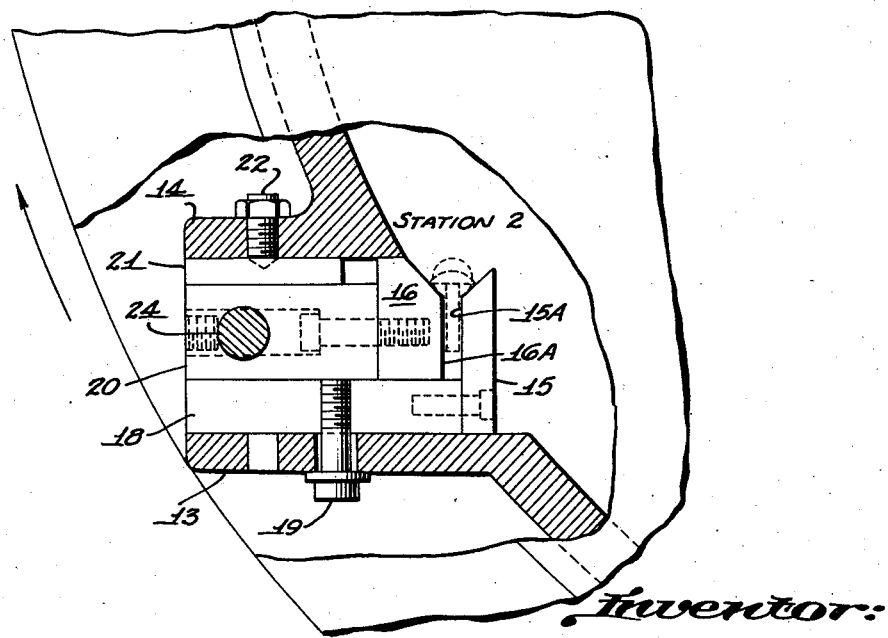
Inventor:
Albert Krasa Patented Sept. 16, 1947

2,427,410

UNITED STATES PATENT OFFICE 2,427,410

TUMBLING CYLINDER FOR GAGING AND ASSORTING RIVETS ACCORDING TO SHANK DIAMETER

Albert Krasa, San Diego, Calif.

Application September 6, 1943, Serial No. 501,382

11 Claims. (Cl. 209—82)

My invention relates more particularly to improvements for sorting rivets salvaged from floor sweepings. In airplane manufacture there is a huge loss of rivets falling to the floor. Rivets having a variety of shank diameters are mixed together in the floor sweepings. It is the object of this invention to separate all of the salvaged rivets of each diameter and discharge them into their respective receptacles. The invention can also be applied to mixed machine screws, nails and other cylindrical parts, with or without a head at one end of each.

Similar numerals indicate similar parts throughout the drawings.

I attain the aforesaid object by mechanism illustrated in the accompanying drawings, in which:

Figure 1 is an end view of the invention. A section is broken away to illustrate the cylinder in cross section and a rivet gage in solid lines. A door hinge and door clamp are also illustrated with sections of the cylinder broken away. The rivet discharging chute illustrated in Fig. 2 is left out in this view for the sake of clarity.

Figure 2 is a rear view of the invention as it pertains to the machine attendant. The pulley driving the conveyor belt is not illustrated here for clarity sake. Most of the chain and sprocket for driving the cylinder are conventionally illustrated. A short section of the chain appears on the sprocket and a few links are shown to indicate a break to the source of power.

Figure 3 is an enlarged view of the construction of the gage shown in the section broken out in Fig. 1.

Figure 4 illustrates the rivet gage adjusting mechanism as viewed from 4—4 of Fig. 1.

Figure 1:
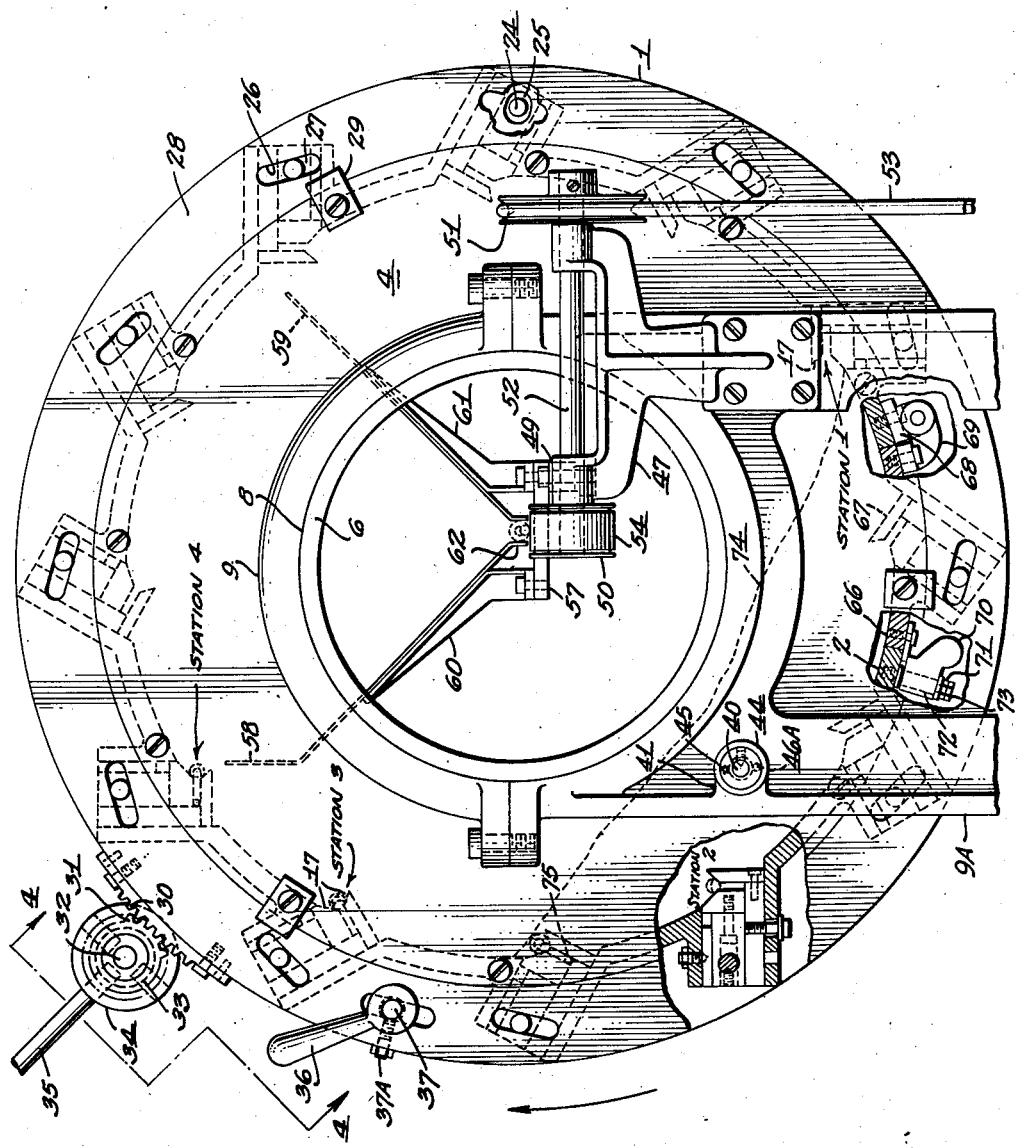

The construction of the cylinder 1 for tumbling the salvaged rivets will now be described.

The cylinder body 2 is constructed with a machined flange 3 at each end for rigidly securing the cylinder supporting members 4 and 5 respectively. Each member is provided with an outward extending hub 6 and 7 respectively, on each of which is machined a journal 8 concentric with the bore of the cylinder body. The bearings 9 and 10 supporting the cylinder horizontally at the journals 8 are integrally held by the structures 9a and 10a respectively. The structures illustrated with a portion broken away are rigidly fastened to a base (not illustrated). For rotating the cylinder the power driven chain 11 operates the sprocket 12 which is secured to the hub 7.

A plurality of longitudinally disposed slots are machined in spaced relation in the wall of the cylinder body. The slots are machined on a tangent to a circle which is concentric with said cylinder, the purpose of which will be explained later. The slots penetrate through longitudinally disposed ribs reinforcing the cylinder body to form the walls 13 and 14.

Each of the aforesaid slots receive an elongated rivet gage which operates on the shank of the rivet in same manner as the commercially known snap gage. Each gage comprises a fixed gage member 15 and an adjustable gage member 16. The gage members comprising a gage are provided with opposed angular surfaces 17 to facilitate the entry of the shanks of the rivets between the gaging surfaces 15a and 16a. The fixed member 15 is rigidly secured to the narrow side of a rectangular plate 18 in a position to engage the tumbling rivets in said cylinder. The plate 18 is secured to its respective wall 13 by the screws 19. The adjustable gage member 16 is secured to the narrow side of the rectangular gage adjusting plate 20. Plate 20 operates in sliding contact between the plate 18 and gib 21 when adjusting said member 16 for another size of rivet. The gib is held in position against said plate 18 by pointed screws 22 threaded in the wall 14. The screws are secured against movement by lock nuts after adjustment of the gib is made. The gaging surface 16a is at ninety degrees to the plane of movement of the plate 20 and is parallel to and in opposed relation to the gaging surface 15a of the fixed gage member 15. The plate 18 serves as a support to headless cylindrical parts trapped between the said gaging members in the operation of the machine. A headless part 75 is illustrated in a gage in Fig. 1. Since the members 15 and 16 are perpendicular to the plate 18 the gage is portrayed as being U-shaped in its cross-section. A rim 23 provided on each of said cylinder supporting members 4 and 5 fits the bore of the cylinder body 2 and extends inward to the gages. Rivets tumbling on the sloping surface 23a on said rim gravitate to the gages. See Fig. 2.

The studs 24, one of which is secured to each end of a gage adjusting plate 20 penetrate through suitable openings 25, Fig. 1, in the cylinder body to engage the cam surfaces 26 of the cam slots 27 which are machined in each of the cam rings 28 in exact relation. In Fig. 2 only one of said plates 20 is illustrated with said studs in position. The cam rings rotate on the peripheries of their respective cylinder supporting members 4 and 5 and are slidably held against the machined surfaces of the aforesaid flanges 3 of the cylinder body by plates 29 secured to the members 4 and 5. The cam rings are each provided with a segment of gear teeth 30 for rotating them in unison by means of the gears 31. The gear shaft 32 to which the gears 31 are secured is supported by bearings 33 provided on the peripheries of the flanges 3 of the cylinder body. A hub 34 secured to shaft 32 is provided with holes on its periphery suitable for entering a removable rod 35 by which the gear shaft is revolved. Graduations (not illustrated) on the periphery of one of said cam rings indicate the setting of the rivet gages for the various sizes of rivets. Opposite the graduations an indicator pointer on the flange 3 adjacent to said ring determines the setting of the gages for each size of rivet. It is evident from the foregoing that when the cam rings 28 are rotated in either direction all of the adjustable gage members 16 are moved equally to or from the fixed gage member 15.

The cam rings 29 are simultaneously clamped against the flanges 3 after the desired adjustment of the rings are made, by a hand operated nut 36 which is threaded on a rod 37. The rod is supported by bearings machined in the flanges 3 and penetrates through suitable openings in the cam rings. On the opposite end of the rod is a nut 38 locked by a jam nut 39. Both cam rings are thus clamped against movement between the hand operated nut 36 and nut 38. To prevent rod 37 from turning when the hand operated nut is operated, a flat spot machined on said rod is slidably engaged by the flat end of a screw 37a which is preferably threaded through one of said flanges 3 to penetrate the rod bearing and locked by a jam nut.

It is preferable to have the cylinder 1 locked against rotation when making adjustment of the aforesaid gages 16. This is accomplished by the plunger 40 movably supported in bearing 41 on the structure 9a. The plunger is pressed by a spring 42 into a hole 43 machined in the cylinder supporting member 4.

The hole is located so that when said cylinder is locked the gage adjusting rod 35 when placed in a hole in hub 34 is in a convenient position for the attendant to operate. To the plunger is secured a hand knob 44 for withdrawing the plunger after said gage adjustment is completed. On the knob is secured an elongated pin 45 which engages the face 46 of the bearing 41 to keep said plunger out of operative position when the cylinder is rotating. To lock said cylinder, the said knob is rotated to the right or left till the elongated pin is in alignment with a drilled hole 46a of suitable depth in the wall of the bearing 41. The plunger will then be pressed into position for locking said cylinder by spring 42.

The brackets 47 and 48 mounted rigidly to pads provided on the structures 9a and 10a respectively, hold the bar 49, which penetrates the cylinder body 2 and the central opening provided in the hubs 6 and 7. The pulleys 50 and 51 are clamped to a rotatable shaft 52 supported by bearings provided on the bracket 47. A power driven belt 53 operating over pulley 51 drives said shaft. (See Fig. 1.) Pulley 50 drives the conveyor belt 54 which connects with a pulley 55. The belt operates through the central openings provided in the cylinder body and the members 6 and 7. Pulley 55 is rotably mounted on a bracket 56. The latter is secured to the bar 49. Adjustment of the bracket on said bar is provided to tighten the conveyor belt 54 when it becomes stretched from use. The plate 57 is riveted to the bar 49. It contacts the lower side of the upper span of the belt 54 to keep the latter in a straight operating plane.

The rivet guide plates 58 and 59 bent to form an imperfect V in assembly are fastened to brackets 60 and 61 respectively. The latter are clamped to the said plate 57. The plates extend past both ends of the rivet gages with their bottom edges 62 in close proximity to the continuous running conveyor belt 54. The plates are suitably spaced apart over the belt to provide a channel for the rivets carried on said belt. A rivet being conveyed by said belt is shown in phantom in the channel, Fig. 1. Each of the aforesaid plates is formed with an extension 63 to extend the said channel through the central opening of hub 6 to the pulley 50. A chute 64 guides the rivets discharging from the conveyor belt at pulley 50 to a receptacle 65.

To make the cylinder more convenient for filling, a door 66 of suitable size is provided by eliminating a rivet gage 67, see Fig. 1. A pair of hinge brackets 68 suitably spaced apart are secured to the cylinder. The mating hinge members 69 are fastened to the door. The door is clamped in position by the hand operated clamps 70.

Adjustment of each of the clamps to provide for wear is accomplished by turning the nut 71 on the bolt 72 to suit, then locking the nut by the jam nut 73. The door is not illustrated in the other views.

The operation of the machine will now be described.

Before filling the cylinder 1 with a quantity of mixed rivets, the rivet gages are adjusted to receive only the shanks of rivets having the least diameter, supposedly in said quantity. To do this, the cylinder is locked by the plunger 40, after which the hand operated nut 36 is given a turn to relieve the clamping pressure on cam rings 28. Gage adjusting rod 35 is then placed in a convenient hole in the hub 34 and then operated to rotate the cam rings till the graduation representing the smallest size of rivet in said quantity is opposite to the indicator pointer described in the foregoing. The cam rings are then clamped by the nut 36 and the rod 35 removed. The cylinder is now filled through the central opening of either hub 6 or 7 through the door opening if the cylinder is provided with one. The door is then clamped in position. The plunger 40 is withdrawn out of operative position after which power is applied.

Due to the rotation of the cylinder, the rivets therein shift to a position represented by the broken line 74 by frictional contact with the cylinder. The tumbling rivets constantly change in position—a condition which is desirable for sorting out all of the rivets of the size for which the gages are set, from the aforesaid quantity.

Since all the gages are alike in operation, only one will be described in the following:

When a rivet gage approaches the area represented as station 1, see Fig. 1, the fixed gage member 15 projecting into the cylinder presents its forwardly inclined surface 17 as it engages the rivets at the lower edge of the said quantity represented by the broken line 74 with an effect to cause the rivets to move downward toward the gage opening. The V-shaped space between the surfaces 17 on gage members 15 and 16 fill with rivets. Since the gage is set to receive the least diameter of rivets in the said quantity all other rivets filling the V-space are held therein by the forwardly inclined surface 17 of member 15. Those rivets that move into the gage opening become trapped therein because of the surfaces 15a and 16a being in a substantially horizontal plane while passing through the area represented by the aforesaid station 1. The rivets immediately in advance of the trapped rivets also prevent their escape from the gage by pressure caused by the advancing member 15 in the rotation of the cylinder. Any vacant spaces in the elongated said V space is filled while the gage passes through the aforesaid quantity of rivets some of which enter the gage opening. The plane of the gaging surfaces 15a and 16a constantly change in the rotation of the cylinder. At station 2 the said surfaces are substantially vertical. A rivet shown in phantom is in vertical position with its head resting on the surfaces 17. In the same view another rivet of oversize diameter lies in said V-space resting on said surfaces. At station 3 they assume an angular position from vertical, whereat the surface 17 of member 15 is in a substantially horizontal plane. A rivet shown in phantom is trapped between the members 15 and 16 at this station. An oversize rivet is shown in same view, lying in the V-space on the substantially horizontal surface 17. After the said surface 17 of the member 15 is in a horizontal plane it begins to slope downward. This downward slope increases with the rotation of the cylinder. Because of this all the oversized rivets held in said V-space gravitate therefrom to the tumbling rivets in the cylinder before the gage arrives at station 4. The rivets between the gage surfaces 15a and 16a remain trapped till the gage reaches station 4 whereat the gaging surfaces are in a horizontal plane. An extra long rivet trapped between the gaging surfaces is shown in phantom at this station. After reaching the horizontal plane the said surfaces begin to slope downwardly. The sloping increases with the rotation of the cylinder. The trapped rivets now begin to gravitate from the gage in the V-shaped space between the guide plates 58 and 59. The guide plates direct the rivets to the continuous operating conveyor belt 54 by which they are discharged into the chute 64, thence to a receptacle 65. The various changes of position of the gaging surfaces 15a and 16a and the angular surfaces 17 in the operating cycle of the cylinder are produced by having the gage fixed to the cylinder body 2 on a tangent as described in the foregoing. When it is seen that no more rivets are discharging to the receptacle, the said gage together with all of the other gages are set simultaneously and uniformly by the cam ring 28 to sort out the next greater diameter of rivet in aforesaid quantity. To do this the operation described is repeated.

In the appended claims it is to be understood that the diameter of the shank is what is termed commercially as the diameter of a rivet.

Having thus described my invention, what I claim as new and desire to secure by U. S. Letters Patent is:

1. A rivet sorting machine comprising a horizontally disposed rotating cylinder for tumbling a quantity of rivets having a variety of diameters, a plurality of elongated gages longitudinally fixed to said cylinder in spaced relation to engage the tumbling rivets therein, each of which is provided with a fixed gaging member and an adjustable gaging member, said members being spaced apart in opposed relation to trap certain rivets in the engagement with said tumbling rivets, and each of which is adapted to effect the discharge of the trapped rivets by gravity after the gage is out of engagement with said tumbling rivets, a conveyor belt for conveying rivets out of said cylinder, means for guiding the rivets gravitating from the gages to said belt, and means for adjusting the said adjustable members simultaneously to trap other certain rivets from aforesaid quantity.

2. A rivet sorting machine comprising a horizontally disposed rotating cylinder for tumbling a quantity of rivets having a variety of diameters, a plurality of elongated gages longitudinally fixed to said cylinder in spaced relation to engage the tumbling rivets therein, each of which is provided with a fixed member and an adjustable member, said members being spaced apart in opposed relation to trap certain rivets in the engagement with said tumbling rivets and each of which is adapted to effect the discharge of the trapped rivets after the gage has moved out of engagement with the tumbling rivets, means for directing the discharged rivets to a receptacle, means for adjusting the adjustable gaging members simultaneously, and means for locking the said cylinder against rotation in the interval of adjusting said members.

3. In a rivet sorting machine a structure comprised of a rotatable cylinder, an elongated snap gage comprised of a stationary member longitudinally secured to the cylinder and an adjustable companion member, a rotatable ring having a cam provided on each end of said cylinder, means secured to each end of said companion member for engaging the cams whereby the member is adjusted when said rings are rotated and means for operating the rings simultaneously.

4. In a rivet sorting machine the structure comprising a horizontally disposed revolving cylinder for tumbling rivets of mixed diameters, a plurality of like gages longitudinally secured to the cylinder in spaced relation for trapping rivets of a certain diameter in their engagement with the tumbling rivets, each gage being comprised of a fixed member and an adjustable companion member, angular walls extending from the gaging members of each gage with like angles in opposed relation for forming a V shaped mouth with the apex of the included angle in the longitudinal center of the gaging space whereby the longitudinal center of a reclining rivet trapped in the bottom of said mouth will be in alignment with a longitudinal plane centrally located in the space between the gaging surfaces, means for movably supporting the adjustable companion member to maintain the angle of said mouth in each adjustment whereby the apex of said angle will be in the longitudinal center of the gaging space at all times.

5. In a rivet sorting machine a structure comprised of a rotatable cylinder, a plurality of elongated snap gages, each comprised of a stationary member longitudinally secured to the cylinder and an adjustable companion member, a rotatable ring having a like plurality of cams mounted on each end of said cylinder, an eccentric rod adjustably secured to each end of a companion member for engaging a cam on each ring whereby the member is adjusted when said rings are rotated, means for operating the rings simultaneously, and means for clamping the rings to the cylinder.

6. In a structure of the class described the combination of a rotatable rivet tumbling cylinder embodying a cylindrical wall with a plurality of longitudinal openings penetrating the wall in spaced relation, an equal plurality of elongated rivet sorting gages each of which is comprised of a relatively stationary member longitudinally secured to said wall and a companion member which is mounted in one of said openings so that its gaging surface is oppositely spaced from the gaging surface on said relatively stationary member and which is slidably adjustable in a direction perpendicular to the plane of its gaging surface and means mounted on said cylinder for adjusting the companion members.

7. In a structure of the class described the combination of a rotatable rivet tumbling cylinder having a plurality of longitudinal openings penetrating the cylinder in spaced relation, an equal plurality of elongated gages each of which is comprised of a stationary member longitudinally secured to said cylinder and a companion member which is mounted in one of said openings with its gaging surface in opposed spaced relation to the gaging surface of the stationary member and which is slidably adjustable in a direction perpendicular to the plane of its gaging surface, and means for simultaneously adjusting said companion members.

8. The structure defined in claim 7 in further combination with means for locking the aforesaid rivet tumbling cylinder against rotation in the interval of adjusting the said companion members.

9. In a structure of the class described, the combination of a horizontally disposed rotatable cylinder for tumbling a mass of mixed rivets therein, a plurality of elongated gages each of which is formed by opposed walls suitably spaced to admit tumbling rivets of a certain diameter by gravity and a transverse wall for limiting the depth of the space between said walls to restrict the gravitation of elongated rivets of said certain diameter for the purpose of effecting a more rapid gravitational discharge from the gage and each of which gages is longitudinally mounted in spaced relation to said cylinder in a manner that tumbling rivets of said certain diameter will gravitate into the gage space and will gravitate from the gage when the latter is in a certain arc in its revolution.

10. In a structure of the class described, the combination of a rivet tumbling cylinder having a plurality of elongated longitudinal openings penetrating the wall of the cylinder at suitable places and longitudinal walls projecting outward from the cylinder wall for reinforcing the sides of each opening, an equal plurality of rivet sorting gages each of which comprises a stationary member which is longitudinally secured to one of said reinforcement walls and an adjustable companion member which is slidably supported between the stationary member and the opposite reinforcement wall, said members being adapted so that their gaging surfaces are in opposed spaced relation and at an angle suitable for certain rivets to gravitate between them when the gage is in contact with the tumbling rivets, and means for adjusting each companion member to suit rivets of various diameters.

11. The structure described in claim 10 wherein the means for adjusting each companion member is further defined as embracing a rotatable ring mounted on each end of said cylinder, and intermediate means operated by the rotative movement of said rings for adjusting each companion member, each member and rings being adapted for the purpose.

ALBERT KRASA.

REFERENCES CITED

The following references are of record in the file of this patent:

UNITED STATES PATENTS

| Number | Name | Date |
| --- | --- | --- |
| 2,300,124 | King | Oct. 27, 1942 |
| 1,472,279 | Nordstrom | Oct. 30, 1923 |
| 1,026,083 | Duston | May 17, 1912 |
| 2,313,375 | Thompson | Mar. 9, 1943 |
| 219,863 | Howard | Sept. 23, 1879 |